United States Patent [19]
Riede et al.

[11] 4,447,326
[45] May 8, 1984

[54] DEVICE FOR THE DIFFUSION OF SUBSTANCES BETWEEN TWO FLUIDS VIA SEMIPERMEABLE MEMBRANES

[75] Inventors: Gerhard Riede, Vellinge; Kjell H. I. Christopherson, Staffanstorp, both of Sweden

[73] Assignee: Gambro AG, Switzerland

[21] Appl. No.: 245,649

[22] PCT Filed: Mar. 19, 1980

[86] PCT No.: PCT/SE80/00082
§ 371 Date: Mar. 17, 1981
§ 102(e) Date: Mar. 17, 1981

[87] PCT Pub. No.: WO81/02681
PCT Pub. Date: Oct. 1, 1981

[51] Int. Cl.³ .............................................. B01D 31/00
[52] U.S. Cl. ............................ 210/321.3; 210/493.1
[58] Field of Search ............... 210/321.4, 493.1, 321.3, 210/493.5, 493.3; 55/16, 158; 422/48

[56] References Cited

U.S. PATENT DOCUMENTS

| 3,396,849 | 8/1968 | Lande et al. | 210/321.4 |
| 3,585,131 | 6/1971 | Esmond | 210/321.4 |
| 3,862,031 | 1/1975 | Leonard | 210/321.4 |
| 4,219,422 | 8/1980 | Knothe et al. | 422/48 X |

Primary Examiner—Frank A. Spear, Jr.
Attorney, Agent, or Firm—Lerner, David, Littenberg, Krumholz & Mentlik

[57] ABSTRACT

A device for the diffusion of substances between fluids through semi-permeable membranes is disclosed. The device includes a stack of longitudinally extending spacer plates alternating between the folds of a folded semi-permeable membrane in which channels extend longitudinally across the face of the spacer plates, and the spacer plates also include ducts extending transversely through the stack at each end thereof, each being in fluid communication with one of the longitudinally extending sides of the spacer plates, and including a fluid connector extending between the transverse ducts at a location displaced from that longitudinally extending side and the longitudinal channels on the spacer plates.

32 Claims, 20 Drawing Figures

DEVICE FOR THE DIFFUSION OF SUBSTANCES BETWEEN TWO FLUIDS VIA SEMIPERMEABLE MEMBRANES

TECHNICAL FIELD

The present invention relates to a device for the diffusion of substances between two fluids via semipermeable membranes, which are arranged in a stack separated by spacer plates, which on their surfaces are provided with ducts connected to the inlets and outlets for at least one of the said fluids, these spacer plates being arranged in the folds of one or more membranes folded in zigzag.

The device in accordance with the invention is intended in the first place to be used for the purification of blood, that is to say as a so-called artificial kidney. However, it will be clear to those skilled in the art, that the apparatus in accordance with the invention can also be used for many other purposes. It may be used for example for the oxygenation of blood. Alternatively, the device in accordance with the invention may be used for the transfer of substances from one gas to another. The term fluid, as used in the following description, means therefore gas as well as liquid.

BACKGROUND ART

Apparatus of the above-mentioned type are known in themselves and are described in detail for example in the German "Offenlegungsschrift" No. 25 23 803 and U.S. Pat. No. 3,585,131. It may be said, therefore, that these documents constitute part of the background art. For further illustration of the same, reference is made to U.S. Pat. Nos. 3,411,630, 3,501,011, 3,511,381, 3,516,548, 3,734,298, 3,837,496, 4,051,041, 4,062,778, and 4,113,625 all of which show apparatus comprising a stack of spacer plates with membranes preferably arranged in pairs between them which, however, cannot be said to be folded in zigzag. Such folding is disclosed instead, for example, in the U.S. Pat. Nos. 4,116,841, 3,929,295, 3,862,031, 3,788,482 and 3,780,870.

DISCLOSURE OF INVENTION

The device in accordance with the invention is characterised by two transverse ducts, arranged near two opposite front edges of the plates and substantially parallel with these front edges, which open onto at least one of the lateral edges which connect the front edges of the plates. As a result, a very simple apparatus is obtained, wherein both the said fluids can be sealed off securely in respect of one another.

The stacks of plates and membrane portions between them are preferably given an elongated shape with the said lateral edges being arranged in longitudinal direction of the pack. The transverse ducts may extend transversely over the spacer plates, opening onto both the opposite lateral edges. This makes it possible, for example, for two transverse ducts arranged directly opposite one another to be utilized for the supply of one medium, while a space between them which is separated from them by two membrane layers can be utilized for the supply of the other fluid medium.

The membrane material is preferably arranged folded with its folded edges parallel and substantially coinciding with the lateral edges of the plates. The lateral edges may then assist in the folding.

The plates are preferably arranged so that they are inserted into the membrane material from one side only, that is to say into every other fold. One of the said fluids can then be supplied from this side, whilst the other fluid can be introduced from the opposite side, that is to say into the folds from which do not contain any spacer plates. Alternatively, another type of spacer plates may be inserted into the last-named folds.

A particularly good seal can be achieved if sealing beads are arranged in the longitudinal direction of the plates parallel with their lateral edges and near these edges, whose object it is to press the membrane material placed between them against the adjoining spacer plate. In the same way sealing beads may be arranged in the transverse direction of the plates between the said transverse ducts and adjoining front edges, parallel with these edges, in order to press the membrane material placed between them tightly against the adjoining spacer plate. Thanks to these sealing beads, the required quantity of sealing material, which otherwise is injected and used to separate the two fluids from one another, can be limited.

A particularly good tightness is obtained if the stack of spacer plates and membrane material between them is arranged in an outer casing with inlets and outlets for the respective fluids. The sealing material can then be cast in between the outer casing and the stack in the form of strands. Two strands of sealing material can be adapted so as to extend around the stack in its transverse direction, as reckoned from the front edges just inside the openings of the respective transverse ducts. At the same time two other strands may be adapted, so as to extend around the stack in its longitudinal direction just inside the lateral edges in longitudinal direction of the spacer plates. For such an arrangement, a relatively small amount of sealing material is required, as compared with when it has to be spread out between the casing and the stack of spacer plates. Injection of sealing material is facilitated, if the said four strands are cast together to a unit.

The inlets and outlets of the casing for the respective fluids are arranged appropriately outside all the said strands of sealing material in connection with the openings of the transverse ducts and in connection with the space between the doubled membrane arranged in the transverse ducts.

In a preferred embodiment of the invention, the casing consists of a box-like main part and a lid. A particularly good tightness can be achieved if a further strand of sealing material is cast in between the lid and the box-like main part.

On either side of the said sealing strands, sealing beads may be provided in the main part of the casing and/or the lid, in order to seal off the sealing material against the fluids fed into the apparatus. This is particularly important, if the device is to be heat-sterilized whilst filled with liquid.

In a preferred embodiment, ribs are provided between the transverse ducts and the working surfaces of the spacer plates which are adapted so as to support from the outside the doubled membrane material between them, without fully compressing the same. The distance between two such opposite ribs on adjoining plates may be increased in the transverse direction of the plate in the direction from the blood inlet and diminished in the direction towards the blood outlet. In this way the device is utilized in the best possible manner over its entire width.

BRIEF DESCRIPTION OF DRAWINGS

In the following description the invention will be described in greater detail with reference to the enclosed drawings, which show by way of example a preferred embodiment of the subject of the invention and also an alternative embodiment.

BEST MODE OF CARRYING OUT THE INVENTION

The device in accordance with the invention shown as an example is intended first and foremost to be used for dialysis and will be described therefore in the following with reference to such a treatment.

Figure 1:
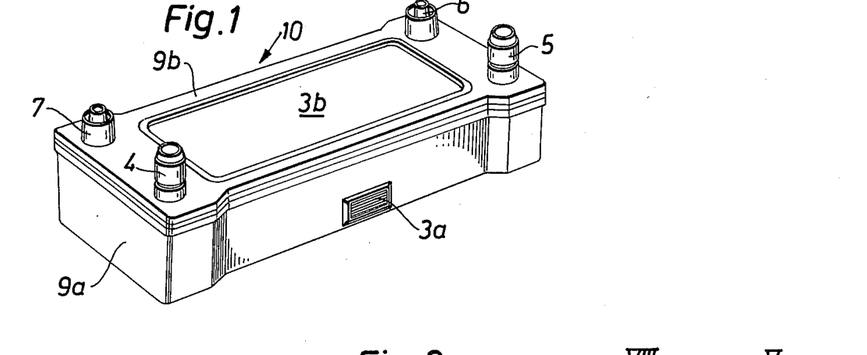
FIG. 1 is a front, perspective view of a preferred embodiment of the complete device of the present invention.

The device comprises an outer casing, which as a whole is designated by numeral 10. This casing consists of a box-like bottom part 9a and an upper lid 9b. An inlet and an outlet for blood are designated 6 and 7 respectively and numerals 4 and 5 designate an inlet and an outlet respectively for dialysate, if the device is to be used as a dialyser. Numerals 3a and 3b designate recessed portions, the first of which is intended to be used for the securing of the device in a dialysis machine, whilst the other is provided in order to economize material.

Figure 3:
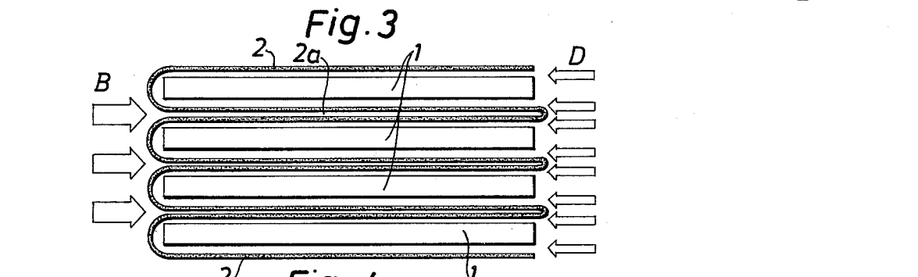
FIG. 3 is a schematic representation of one arrangement of a stack of spacer plates and membrane material for use in the device of the present invention.

The casing 10 shown in FIG. 1 is intended to contain a stack of spacer plates and membrane material between them. In FIG. 3 is shown a preferred arrangement of such a stack with the spacer plates designated 1 and the membrane material 2. The membrane material 2 is folded, so that it forms double folds 2a where the blood can enter as indicated by the arrows B. The dialysate on the other hand can enter from the opposite side, as indicated by the arrows D. In this way the blood can flow on one side of the membrane, that is to say inside the double folds 2a, whilst the dialysate flows in ducts in the plates on the opposite side of the membrane material.

Figure 4:
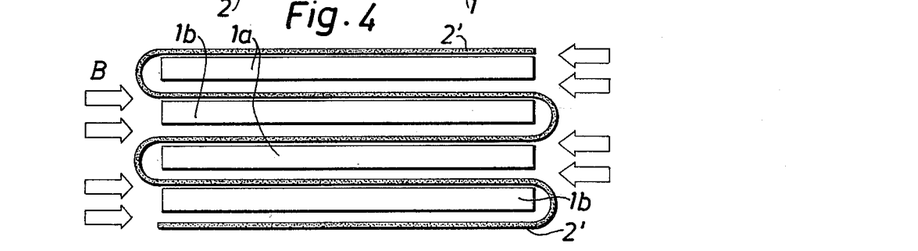
FIG. 4 is a schematic representation of an alternative arrangement of a stack of spacer plates and membrane material for use in the device of the present invention.

FIG. 4 shows an alternative arrangement of the membrane material and spacer plates. The membrane material is designated here 2', whilst the spacer plates are designated 1a and 1b respectively. The spacer plates 1a comprise ducts for the dialysis liquid D, whilst the spacer plates 1b comprise ducts for the blood B.

Figure 2:
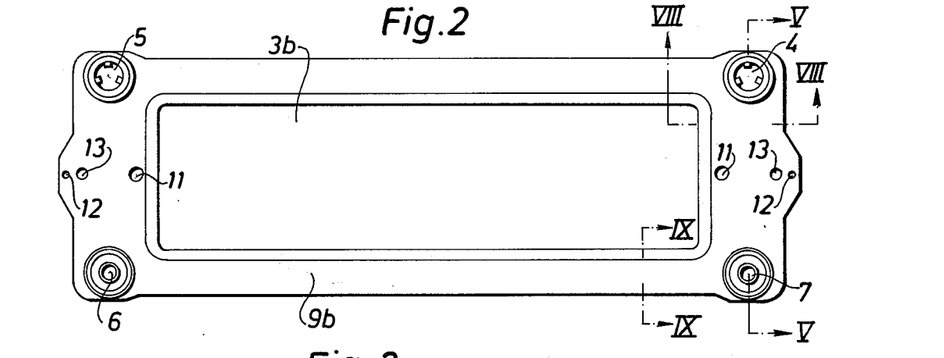
FIG. 2 is a top, perspective view of the device shown in FIG. 1.

FIG. 2 shows from above the lid 9b belonging to the casing 10 shown in FIG. 1. The figure is intended primarily to illustrate the position of the sections shown in the FIGS. 5–9. Numerals 11 and 12 designate the inlet for the injection of a sealing material, for example polyurethane. The manner in which the sealing is carried out will be described in more detail in the following. Numeral 13 designates orientation holes intended to facilitate the stacking of the apparatus as a whole.

Figures 5, 6, 7, 8, 9:
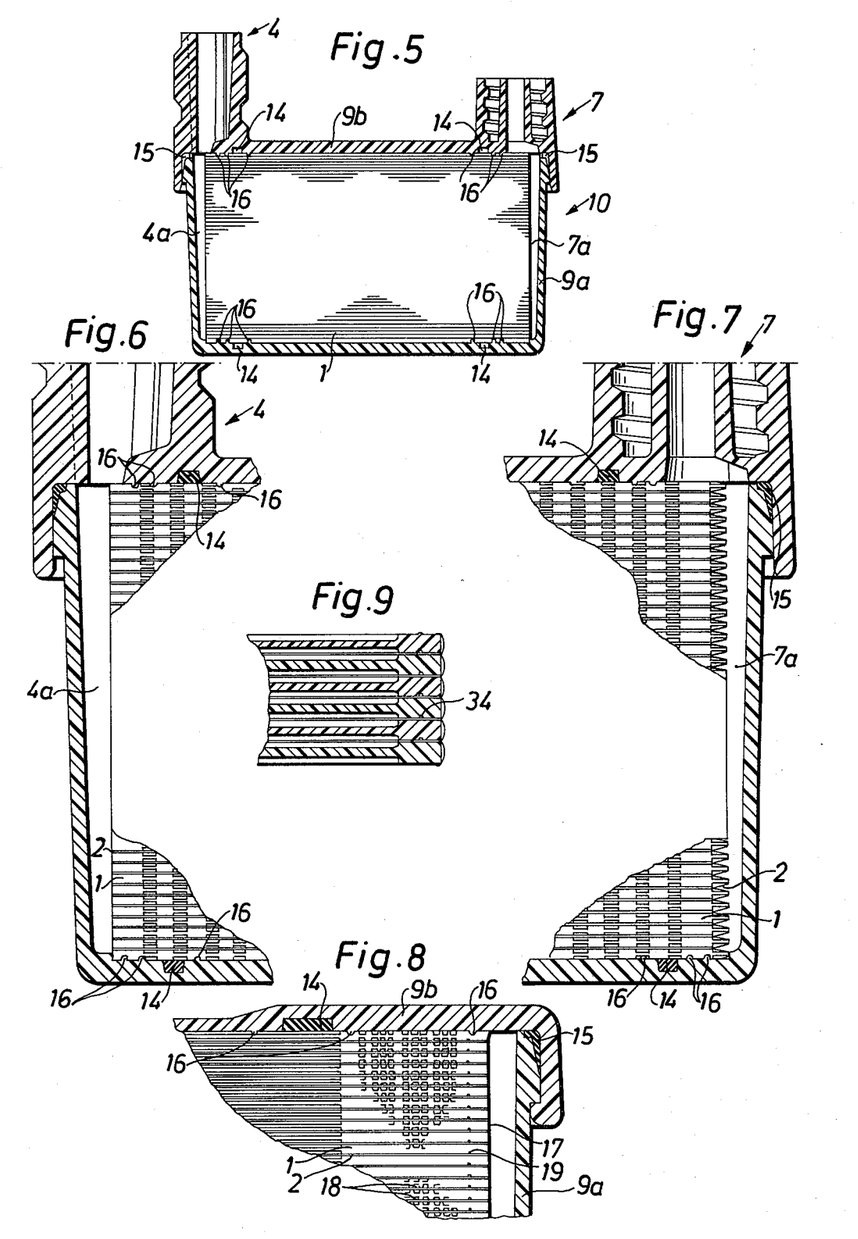
FIG. 5 is a side, sectional view taken along Line V—V of FIG. 2.
FIG. 6 is a partial, sectional, enlarged, side view of the left hand side of the device shown in FIG. 5.
FIG. 7 is a partial, sectional, enlarged, side view of the right hand portion of the device shown in FIG. 5.
FIG. 8 is a partial, sectional, side view of a portion of the device shown in FIG. 2, taken along Line VIII—VIII thereof.
FIG. 9 is a partial, sectional, enlarged, side view of a portion of the device shown in FIG. 2, taken along Line IX—IX thereof.

FIG. 5 shows a section along line V—V in FIG. 2. The casing 10, consisting of the component parts 9a and 9b, contains a stack of spacer plates 1 with membrane material between them. The latter, designated 2, can be seen more clearly in the enlarged sections in FIGS. 6 and 7. Numerals 14 and 15 designate strands of sealing material, which will be described more fully in the following, with reference primarily to FIGS. 10 and 12. In connection therewith, a more detailed explanation will also be given of the sealing beads 16. Numeral 4a designates an extension of the inlet 4 for dialysis liquid and 7a designates a corresponding extension of the blood outlet 7.

In FIG. 8, which constitutes a section along line VIII—VIII in FIG. 2, examples of sealing strands 14 and 15 and sealing beads 16 are shown. FIG. 8 also shows a cross-section through the transverse ducts 18 arranged across the spacer plates 2 near their front edges 17 and parallel with these. Finally, FIG. 8 shows further sealing grooves 19, which will be explained in more detail in the following.

Figure 10:
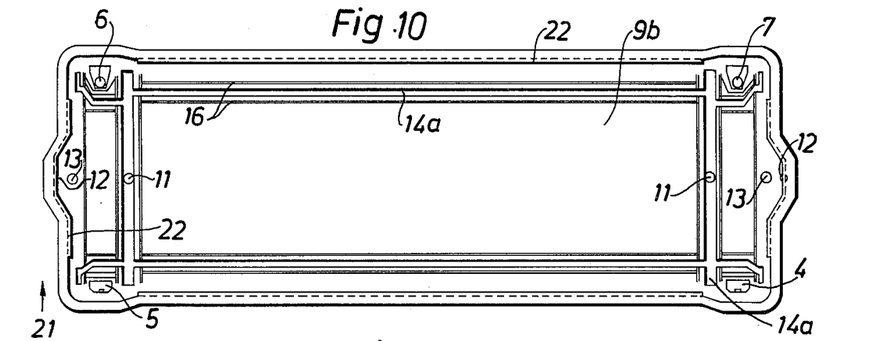
FIG. 10 is a bottom, perspective view of a lid for use in connection with the device of the present invention.
Figure 11:
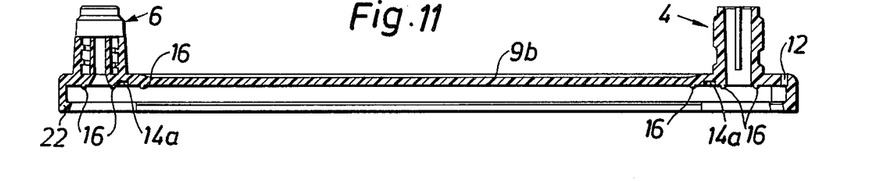
FIG. 11 is a side, longitudinal, sectional view of the lid shown in FIG. 10.

In FIGS. 10 and 11 is shown the lid 9b, seen from underneath and in the form of a longitudinal section. In FIG. 10 is shown the inlet 6 and the outlet 7 for blood and the inlet 4 and the outlet 5 for dialysis liquid, seen from underneath or from inside the casing 10. The sealing strands 14 shown in FIGS. 5–8 are formed through ducts 14a, which are in connection with the injection openings 11, shown in FIG. 2. The ducts 14a continue also in the bottom part 9a. Consequently, the strands 14 will extend around the whole stack of spacer plates 1 and the membrane material 2 between them in longitudinal direction as well as in transverse direction of the stack. In FIG. 10 are evident also the holes 13, which facilitate stacking and the injection holes for the sealing strands 15. Furthermore, sealing beads 16 are evident on both sides of the ducts 14a. Finally, numeral 22 designates a clamping flange intended for the securing of the lid.

Figure 12:
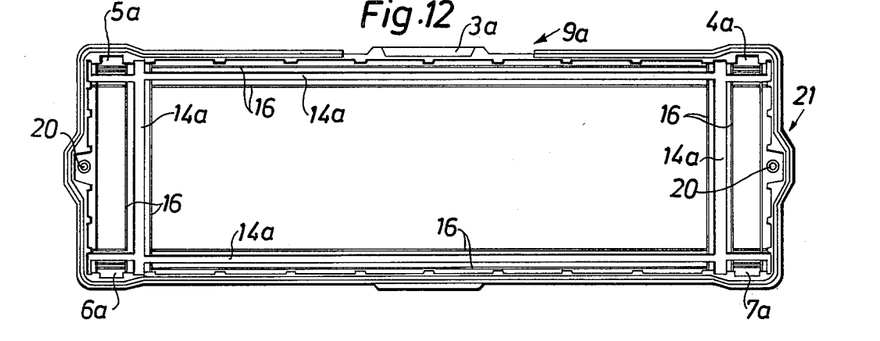
FIG. 12 is a top, perspective view of the bottom casing portion of a device in accordance with the present invention.
Figure 13:
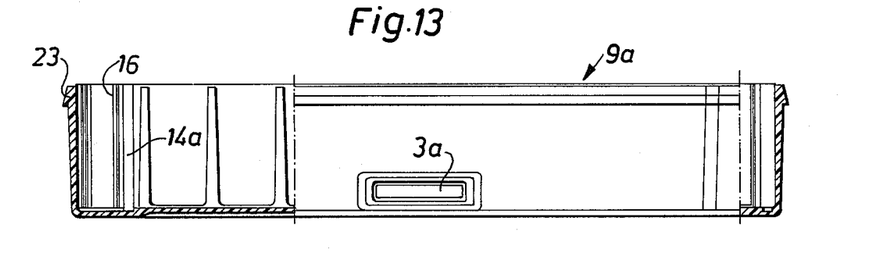
FIG. 13 is a side, longitudinal, partial sectional view of the bottom casing portion shown in FIG. 12.

In FIGS. 12 and 13, the bottom part 9a is shown partly in section seen from above and from the side. Here too, the groove 14a can be recognized which gives rise to the sealing strands 14. Correspondng to the holes 13, which facilitate the stacking, we find here a recessed portion 20. It should be noted that the recessed portion 20 is situated opposite a bulging portion 21, which is also evident on the lid 9b in FIG. 10, but which is not shown in the more schematically drawn FIG. 1.

On both sides of the grooves 14a, FIG. 12 also shows the sealing beads 16 indicated in the FIGS. 5–8. These are intended to prevent the sealing material used from being forced out of the grooves 14a. At the same time, these sealing beads 16 prevent the blood as well as the dialysis liquid or other liquids supplied from making contact with the sealing material used. This is particularly important, if the dialyser is intended to be heat-sterilized when filled with liquid, since otherwise material might be transferred from the binder into the incoming liquids.

The lid 9b is secured to the bottom part 9a with the help of the clamping flange 22, which engages underneath a corresponding clamping flange 23 on the bottom part. Numerals 4a, 5a, 6a and 7a in FIG. 12 designate extensions of the corresponding inlets and outlets 4, 5, 6 and 7 for dialysis liquid and blood respectively.

Other details shown in the FIGS. 10–13 should be more or less self-explanatory to those skilled in the art, or they are of minor importance in respect of the invention and do not, therefore, require detailed description in the present description.

Figure 14:
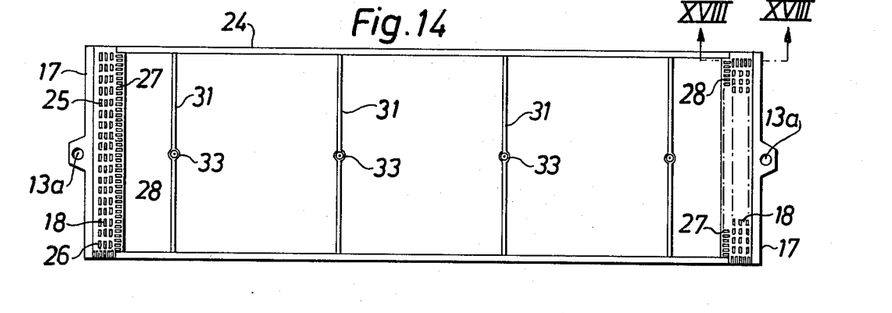
FIG. 14 is a top, perspective, partial view of a spacer plate for use in connection with the device of the present invention.
Figures 15, 16:
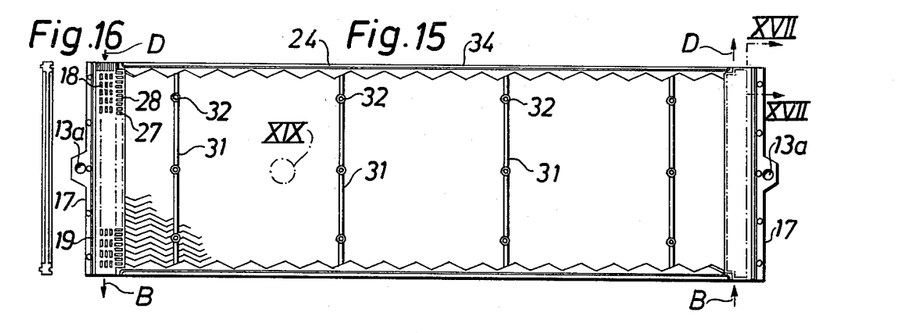
FIG. 15 is a bottom, perspective, partial view of a spacer plate for use in connection with the device of the present invention.
FIG. 16 is a perspective, end view of the spacer plate shown in FIGS. 14 and 15.
Figure 17:
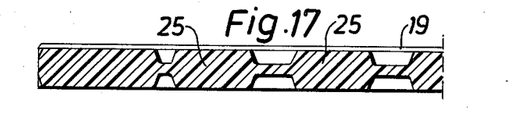
FIG. 17 is a side, sectional, partial view of a portion of the spacer plate shown in FIG. 15, taken along Line XVII—XVII thereof.
Figure 18:
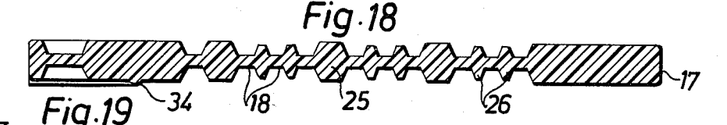
FIG. 18 is a partial, side, sectional view of the spacer plate shown in FIG. 15, taken along Line XVIII—XVIII thereof.
Figure 19:
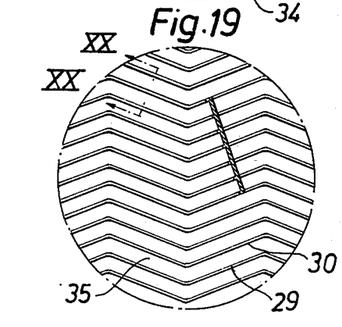
FIG. 19 is a partial, enlarged, partially sectional view of a portion of the spacer plate shown in FIG. 15, taken in circular area XIX thereof.

The FIGS. 14–20 show a preferred embodiment of the spacer plates 1 included in the device in accordance with the invention. FIG. 14 shows a plate seen from underneath, whilst FIG. 15 shows the same seen from above and FIG. 16 is an end view.

The plate can be patterned in a largely conventional manner, for example in accordance with anyone of the above-mentioned patents. However, it is essential in accordance with the invention that the plate is provided at its ends with the transverse ducts 18, which are also shown in FIG. 8. These transverse ducts 18 should open onto at least one of the lateral edges 24. In the example shown, the transverse ducts 18 run transversely over the plates 1 and thus open onto both lateral edges 24. The transverse ducts are parallel with the front edges of the plates. As can be seen from FIGS. 17 and 18, the transverse ducts 18 contain ribs 25, which are adapted so as to press adjoining membranes in a tight manner against adjoining spacer plates. Moreover, the transverse ducts comprise smaller supporting ribs or supporting fins 26, which are intended simply to support the membranes from the outside. Between the transverse ducts 18 and the working surfaces proper, similar pressure ribs 27 are present with somewhat lower supporting ribs 28 marked in black. The supporting ribs 28 become progressively lower, the farther away they are situated from the blood inlet and the blood outlet respectively, which is indicated by the arrows B in FIG. 15. As a result, an even flow of blood is achieved across the whole width of the plate. The working surface itself, as can be seen more clearly in FIG. 19, consists of zigzag-shaped ridges 29 and 30.

Figure 20:
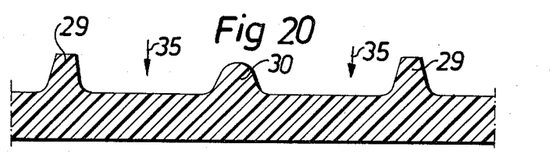
FIG. 20 is a partial, side, sectional view of a portion of the view shown in FIG. 19, taken along Line XX—XX thereof.

FIG. 20 shows that the ridges 30 are somewhat lower compared with the ridges 29. Numeral 31 designates transverse distributing ducts, which are intended to facilitate the distribution of the blood and of the dialysis liquid on passing the supporting points 32 and the casting points 33.

Numeral 19 designates sealing beads arranged between the transverse ducts 18 and the front edges 17. Corresponding sealing beads placed parallel with the longitudinal edges 24 of the plate are designated 34. They can be seen for example, also in FIG. 9. Thanks to the sealing grooves 19 and 34, the quantity of sealing material injected can be limited to the strands 14 (FIG. 5–8).

On the spacer plates 1 the holes facilitating stacking are also present, designated here 13a. Other details given in FIGS. 14–20 will readily be understood by those skilled in the art and do not therefore require detailed description.

Naturally, the invention is not limited exclusively to the details described above, but may be varied within the scope of the following claims. For example, the spacer plates may be modified to resemble any of the spacer plates described in the aforementioned patents. Alternatively, it is of course possible to conceive completely new patterns.

We claim:

1. A device for diffusion of substances between first and second fluids through a semi-permeable membrane, said device comprising a stack of longitudinally extending spacer plates including first and second ends and first and second longitudinally extending sides, said spacer plates alternating between the folds of a folded semi-permeable membrane, first fluid feed means for feeding said first fluid to one side of said folded semi-permeable membrane at said first end of said spacer plates, first fluid withdrawal means for withdrawing said first fluid from said one side of said folded semi-permeable membrane at said second end of said spacer plates, second fluid feed means for feeding said second fluid to the other side of said folded semi-permeable membrane, second fluid withdrawal means for withdrawing said second fluid from said other side of said folded semi-permeable membrane, channel means extending longitudinally across the faces of said spacer plates, said spacer plates including transverse duct means extending transversely across substantially the entire width of said faces of said spacer plates, said transverse duct means being in fluid communication with both said first and second longitudinally extending sides of said spacer plates and being substantially continuous across the length thereof whereby no direct fluid communication is provided between said traverse duct means and the opposite side of said spacer plates through said spacer plates, and fluid connecting means extending between said transverse duct means and said channel means for providing fluid communication therebetween.

2. The device of claim 1 wherein said folds of said folded semi-permeable membrane terminate in folded ends substantially coinciding with said first and second longitudinally extending sides of said spacer plates.

3. The device of claim 2 wherein said spacer plates alternate with every second fold of said folded semi-permeable membrane whereby said spacer plates are in contact with only one side of said semi-permeable membrane.

4. The device of claim 2 wherein said spacer plates include longitudinally extending sealing beads adjacent to each of said first and second longitudinally extending sides thereof whereby said folded semi-permeable membrane is sealingly pressed between said longitudinally extending sealing beads and the surface of the next adjacent spacer plate in said stack of spacer plates.

5. The device of claim 2 wherein said spacer plates include transversely extending sealing beads located between said transverse duct means and said first and second ends of said spacer plates, respectively, whereby said folded semi-permeable membrane is sealingly pressed between said transversely extending sealing beads and the surface of the next adjacent spacer plate in said stack of spacer plates.

6. The device of claim 1 including an outer casing for said stack of longitudinally extending spacer plates, said outer casing providing for passage of said first and second fluid feed means and said first and second fluid withdrawal means therethrough.

7. The device of claim 6 including sealing material casting means for casting a sealing material so as to provide fluid seals between said first and second fluids within said outer casing.

8. The device of claim 7 wherein said sealing material casting means comprises strands of sealing material extending transversely around said stack of spacer plates at a location adjacent to said transverse duct means displaced fom said first and second ends of said spacer plates.

9. The device of claim 7 wherein said sealing material casting comprises strands of sealing material extending longitudinally around said stack of spacer plates at a location adjacent to the first and second longitudinal edges of spacer plates.

10. The device of claim 8 or 9 wherein said strands of casting material are continuous whereby they may be cast together as a single unit.

11. The device of claim 8 or 9 wherein said first and second fluid feed means and said first and second fluid withdrawal means are located between said strands of sealing material and said outer edges of said spacer plates.

12. The device of claim 7 including a pair of parallel sealing beads surrounding said sealing material casting means so as to prevent said first or second fluid from contacting said sealing material.

13. The device of claim 6 wherein said outer casing comprises a box-like member and a cover member.

14. The device of claim 13 including cover member sealing means comprising sealing material cast between said box-like member and said cover member for providing a fluid seal between said box-like member to said cover member.

15. The device of claim 1 wherein said fluid connecting means comprises rib means located between said transverse duct means and said channel means for supporting said folded semi-permeable membrane therebetween.

16. The device of claim 15 wherein said rib means comprises a plurality of rib members extending longitudinally across said spacer plate.

17. The device of claim 15 wherein said plurality of rib members have a continuously increasing transverse height as seen in a direction transversely from said first fluid feed means across said first end of said spacer plates, and have a continuously decreasing transverse height as seen in a direction transversely towards said first fluid withdrawal means across said second end of said spacer plates.

18. The device of claim 1 including support members located in said transverse duct means adjacent to said first longitudinally extending sides of said spacer plates whereby said semi-permeable membrane is supported above the surface of said spacer plates by said support members.

19. The device of claim 18 wherein said support members include a plurality of rib members.

20. The device of claim 18 wherein said transverse duct means is substantially flat and free of said support means at a location adjacent to said second longitudinally extending sides of said spacer plates whereby said semi-permeable membrane is free to contact said surface of said spacer plates at said location.

21. A device for diffusion of substances between first and second fluids through a semi-permeable membrane, said device comprising a stack of longitudinally extending spacer plates including first and second ends and first and second longitudinally extending sides, said spacer plates alternating between the folds of a folded semi-permeable membrane, first fluid feed means for feeding said first fluid to one side of said folded semi-permeable membrane at said first end of said spacer plates, first fluid withdrawal means for withdrawing said first fluid from said one side of said folded semi-permeable membrane at said second end of said spacer plates, second fluid feed means for feeding second fluid to the other side of said folded semi-permeable membrane, second fluid withdrawal means for withdrawing said second fluid from said other side of said folded semi-permeable membrane, channel means extending logitudinally across the faces of said spacer plates, said spacer plates including transverse duct means extending transversely across substantially the entire width of said faces of said spacer plates, said transverse duct means being in fluid communication with said first longitudinally extending sides of said spacer plates, fluid connecting means extending between said transverse duct means and said channel means for providing fluid communication therebetween, and sealing bead means extending longitudinally along substantially the entire length of said spacer plates adjacent to said first and second longitudinally extending sides of said spacer plates, whereby said folded semi-permeable membrane is sealingly pressed between said sealing bead means and the surface of the next adjacent spacer plate in said stack of spacer plates.

22. The device of claim 21 wherein said transverse duct means is in fluid communication with both said first and second longitudinally extending sides of said spacer plates.

23. The device of claim 21 including transversely extending sealing beads extending transversely across substantially the entire width of said spacer plates, said transversely extending sealing beads being located between said transverse duct means and said first and second ends of said spacer plates, respectively, whereby said folded semi-permeable membrane is sealingly pressed between said transversely extending sealing beads and the surface of the next adjacent spacer plate in said stack of spacer plates.

24. The device of claim 21 including an outer casing for said stack of longitudinally extending spacer plates, said outer casing providing for passage of said first and second fluid feed means and said first and second fluid withdrawal means therethrough.

25. The device of claim 24 including sealing material casting means for casting a sealing material so as to provide fluid seals between said first and second fluids within said outer casing.

26. The device of claim 25 wherein said sealing material casting means comprises strands of sealing material extending transversely around said stack of spacer plates at a location adjacent to said transverse duct means displaced from said first and second ends of said spacer plates.

27. The device of claim 25 wherein said sealing material casting comprises strands of sealing material extending longitudinally around said stack of spacer plates at a location adjacent to the first and second longitudinal edges of spacer plates.

28. The device of claim 26 or 27 wherein said strands of casting material are continuous whereby they may be cast together as a single unit.

29. The device of claim 26 or 27 wherein said first and second fluid feed means and said first and second fluid withdrawal means are located between said strands of sealing material and said outer edges of said spacer plates.

30. The device of claim 25 including a pair of parallel sealing beads surrounding said sealing material casting means so as to prevent said first or second fluid from contacting said sealing material.

31. The device of claim 24 wherein said outer casing comprises a box-like member and a cover member.

32. The device of claim 31 including cover member sealing means comprising sealing material cast between said box-like member and said cover member for providing a fluid seal between said box-like member to said cover member.

* * * * *

UNITED STATES PATENT AND TRADEMARK OFFICE
CERTIFICATE OF CORRECTION

PATENT NO. : 4,447,326
DATED      : May 8, 1984
INVENTOR(S): Riede et al

It is certified that error appears in the above—identified patent and that said Letters Patent are hereby corrected as shown below:

Column 1, line 41, "3,929,295" should read -- 3,979,295 -- .

Column 2, line 4, cancel the word "from".

Column 2, line 44, after "membrane" insert -- material -- .

Column 7, line 31, "fom" should read -- from -- .

Signed and Sealed this

Ninth Day of October 1984

[SEAL]

Attest:

GERALD J. MOSSINGHOFF

*Attesting Officer*

*Commissioner of Patents and Trademarks*